United States Patent
Pham-Huu et al.

(10) Patent No.: US 7,101,494 B2
(45) Date of Patent: Sep. 5, 2006

(54) METHOD FOR OBTAINING SYNTHESIS GAS BY PARTIAL CATALYTIC OXIDATION

(75) Inventors: Cuong Pham-Huu, Saverne (FR); Marc-Jacques Ledoux, Strasbourg (FR); Pascaline Leroi, Schiltigheim (FR); Sabine Savin-Poncet, Buros (FR); Jacques Bousquet, Irigny (FR)

(73) Assignee: Totalfinaelf France, Puteaux (FR)

( * ) Notice: Subject to any disclaimer, the term of this patent is extended or adjusted under 35 U.S.C. 154(b) by 174 days.

(21) Appl. No.: 10/481,106

(22) PCT Filed: Jun. 18, 2002

(86) PCT No.: PCT/FR02/02093

§ 371 (c)(1),
(2), (4) Date: Dec. 18, 2003

(87) PCT Pub. No.: WO03/000398

PCT Pub. Date: Jan. 3, 2003

(65) Prior Publication Data

US 2005/0119355 A1 Jun. 2, 2005

(30) Foreign Application Priority Data

Jun. 21, 2001 (FR) .................................. 01 08170

(51) Int. Cl.
*C01B 3/38* (2006.01)

(52) U.S. Cl. ...................... 252/373; 252/373

(58) Field of Classification Search ............... 252/373; 423/648.1, 650, 651
See application file for complete search history.

(56) References Cited

U.S. PATENT DOCUMENTS

| 4,394,137 | A | * | 7/1983 | Marion et al. ............ 48/197 R |
| 5,023,276 | A | * | 6/1991 | Yarrington et al. ......... 518/703 |
| 6,409,939 | B1 | * | 6/2002 | Abdo et al. ................. 252/373 |
| 6,409,940 | B1 | * | 6/2002 | Gaffney et al. ............. 252/373 |
| 6,488,838 | B1 | * | 12/2002 | Tonkovich et al. ......... 208/108 |
| 6,911,161 | B1 | * | 6/2005 | Xu et al. .................... 252/373 |

FOREIGN PATENT DOCUMENTS

| FR | 2062615 A | 6/1971 |
| WO | WO 96 04200 A | 2/1996 |
| WO | WO 97 37929 A | 10/1997 |
| WO | WO 99/35082 A1 | 7/1999 |
| WO | WO 00/76651 A1 | 12/2000 |

OTHER PUBLICATIONS

K. Heitnes Hofstad et al.; "Partial oxidation of methane to synthesis gas over rhodium catalysts" Caralysis Today, vol. 40, 1998, pp. 157-170, (no month).

* cited by examiner

*Primary Examiner*—Wayne A. Langel
(74) *Attorney, Agent, or Firm*—Sughrue Mion, PLLC

(57) ABSTRACT

The invention relates to a method for obtaining synthesis gas by partial catalytic oxidation, consisting in bringing a hydrocarbon in a gaseous state into contact with an oxidizing gas, and therefore possibly a small amount of water vapor, in the presence of a catalyst comprising at least one silicon carbide at a temperature of more than 800° C. According to the invention, the silicon carbide has a specific surface which is determined by the BET method and which is less than or equal to 100 m²/g, the contact time between the mixture of gaseous hydrocarbon, oxidizing gas and silicon carbide being more than 0.05 seconds and the pressure inside the reactor being greater than atmospheric pressure.

23 Claims, 2 Drawing Sheets

METHOD FOR OBTAINING SYNTHESIS GAS BY PARTIAL CATALYTIC OXIDATION

This application is a 371 of PCT/FR02/02093, filed on Jun. 18, 2002; the disclosure of which is incorporated herein by reference.

This invention pertains to a technique for obtaining synthesis gas with or without fire. More specifically, it involves techniques known as auto-thermal reforming or ATR and catalytic partial oxidation (CPOx) without any steam or with a limited quantity of water vapor.

The techniques for obtaining synthesis gas by reforming methane with steam are well known in industry and have been the basis for the development of the fertilizer and methanol industries and of many major intermediate products in the chemical industry. However, these techniques, which use water vapor as the principal agent of methane oxidation, result in the creation of hydrogen-rich synthesis gas with $H_2/CO$ molar ratios far above 2, which is a value that is sought specifically, when the synthesis gas is transformed into paraffinic hydrocarbons with mostly —$CH_2$— links. In particular, an $H_2/CO$ molar ratio of 2 is necessary for the conversion of synthesis gas into hydrocarbons through the Fischer Tropsch reaction.

The replacement of the water vapor with oxygen as a methane oxidation agent theoretically results in obtaining an $H_2/CO$ molar ratio of 2. In practice, however, it is difficult to use oxygen alone due to the high risk of the formation of coke; therefore, it is still necessary to add water vapor. This is why the ATR technique was developed. It unites partial combustion and catalytic conversion in two successive steps in the same reactor. However, this process uses too great a quantity of water vapor, which causes a drop in the equilibrium temperature of the gaseous mixture at the outlet of the reactor and thus leads to an increased production of $CO_2$ to the detriment of CO.

Manufacturers are therefore still interested in a partial oxidation technique for methane that makes it possible to obtain an $H_2/CO$ molar ratio of 2 directly in the output gas, under feasible working conditions, with minimal $CO_2$ content.

Among the techniques for producing synthesis gas through the catalytic partial oxidation of methane, it is common to operate in the presence of metallic oxide-based catalysts at temperatures above 700° C., and rarely above 1,000° C., as described in documents U.S. Pat. Nos. 5,744,419 A, 6,007,699 A, WO 85/05094 A, and EP 0 742 172 A. These catalysts generally contain one or more of the metals in the group comprised of platinum, palladium, rhodium, ruthenium, iridium, nickel, iron, and cobalt, supported by at least one refractory oxide from the group comprised of alumina, titanium oxide, silica, zirconia, and magnesia. However, maintaining temperatures above 700° C. throughout the process promotes the sintering of these catalysts and the formation of carbon deposits that block the active sites of the catalyst, resulting in the deactivation of the catalyst. While this sintering is occurring, one can also observe a migration of the active nature of the catalyst in the support, which makes catalyst regeneration more difficult and more costly, as well as the resumption of the active phase, in the case of precious metals in particular.

Furthermore, the implementation of these techniques of converting methane, or more generally, hydrocarbons into synthesis gas makes it necessary to work with highly critical contact times between the catalyst and the gas flow, which, because they are difficult to control, are preferably shorter than 10 ms (10 milliseconds, or 0.01 seconds). Although such requirements are not respected when the process is initiated, since the reaction is exothermic and the heat transfer inside the catalyst bed is insufficient, the system may potentially experience runaway or even explode. Understandably, manufacturers are hesitant to use these techniques, given the personal safety hazards that these processes may present.

In EP 313 480 A, it is suggested that silicon carbide with a high specific surface of greater than 100 $m^2/g$, measured using the BET method, even at 1,000° C., and preferably greater than 200 $m^2/g$, possibly supporting a metal such as tungsten or nickel, be used in the catalyst beds for the controlled oxidation of hydrocarbons such as methane. Such catalysts offer the advantage of resisting double poisoning by coke and by the metals, as the coke is not a disturbance since the catalyst is easily regenerated, and because the metals can be recovered due to the chemical resistance of the silicon carbides used as supports. However, no advantage of any kind pertaining to the implementation of a controlled oxidation process is described in EP 313 480 A, particularly in terms of initiating the process or concerning the characteristics necessary for the process to function while maintaining complete personal safety.

In order to prevent the occurrence of explosive reactions, which are difficult to control, the Applicant has developed a technique for producing synthesis gas with or without fire, by which initiation operations are facilitated through improved heat conductibility inside the catalyst bed and a much slower gas output in the reactor in which the reaction occurs, thus making it possible to control the reaction, both at temperatures greater than 1,000° C. and at a temperature of 800° C., since the catalyst bed mechanically resists these temperatures.

The purpose of this invention is therefore to provide a technique for obtaining synthesis gas through catalytic partial oxidation with or without fire, consisting of putting a hydrocarbon in its gaseous state in contact with an oxidizing gas, as well as a limited quantity of water vapor when necessary, in the presence of a catalyst that includes at least one silicon carbide, at a temperature above 800° C., characterized in that the silicon carbide has a specific surface, as determined by the BET method, of less than or equal to 100 $m^2/g$, where the contact time between the gaseous hydrocarbon mixture, the oxidizing gas and when applicable the water vapor, and the catalyst is greater than 0.05 seconds, and in that the pressure inside the reactor is greater than atmospheric pressure.

According to one important characteristic of this process, one can adjust, first, the reaction temperature to a value of between 800° C. and 1,400° C., and second, the contact time of the gaseous hydrocarbon mixture, the oxidizing gas, and when necessary the water vapor, with the catalyst between 0.05 and 5 seconds.

In addition to the advantages related to the actual nature of one part of the catalyst, the technique described in this invention offers the advantage of operating under non-critical conditions, particularly concerning the contact time of the gaseous mixture (hydrocarbon gas, oxidizing gas, and water vapor) with the catalyst. Also, the catalyst support is a perfect conductor for the heat produced when the reaction is initiated, which makes it possible to prevent the runaway phenomena observed by applying the prior art. This good heat conductivity in the support makes it possible to maintain proper homogeneity of the catalyst temperature in the bed, and therefore to avoid the formation of hot points that generate coke, which promotes a sintering phenomenon in the active phase, as observed in earlier techniques. This makes it possible to use a single bed in a traditional reactor and thus to avoid the use of a tube reactor, which is always difficult to fill uniformly with grains of catalyst powder. Another advantage is the ability to increase the temperature of the catalyst bed, which makes for improved conversion into synthesis gas, whether the reaction takes place in the presence or in the absence of water vapor, in the context of an application in ATR units or catalytic POx.

In the technique described in this invention, the oxidizing gas may contain more than 20% oxygen by volumes and preferably between 40% and 100% oxygen by volume.

In order to implement the technique described in this invention, a molar ratio of the carbon in the hydrocarbon (C) to the oxygen that approaches the stoichiometry of the reaction for obtaining synthesis gas, or more specifically, a value varying within a range between 1.6 and 2.6, will be chosen.

Contrary to the specifications from prior art, the catalyst contains more than 50% silicon carbide by weight, with a BET-determined specific surface, which according to the French Standard (NF) X11-621, is less than 100 $m^2/g$, in particular between 15 and 80 $m^2/g$, and preferably between 20 and 40 $m^2/g$. These silicon carbides also have a mesoporosity determined by the nitrogen BET method, according to the standard NF X11-621, of between 20 and 100 mn, and a macroporosity determined by a mercury porosity measurement of between 5 and 100 μm.

Preferably, the silicon carbide used as a support is solid and comprised of formed or unformed grains or of solid foam. By formed grains, what is meant is grains in the form of carbide balls, extruded grains in the form of cones, trilobes or otherwise, or monoliths in the form of disks or conic sections.

In a preferred method of implementing the technique described in this invention, the pressure in the reactor can be maintained at a value of between $2 \times 10^5$ and $150 \times 10^5$ Pa, and preferably between $5 \times 10^5$ and $80 \times 10^5$ Pa.

The silicon carbide in the catalyst can serve as a support for the metals in Group VIII. The metal content of Group VIII is between 0.5% and 20% of the weight of the catalyst, and preferably between 1% and 10% of the catalyst weight. The preferred Group VIII metal is nickel.

The catalyst can be obtained by any of the methods known to an expert in the field. In particular, it can be prepared by impregnating the silicon carbide using a solution containing a salt of at least one metal from Group VIII, where the impregnated metallic salt is subsequently decomposed by calcination in air at between 300° C. and 400° C. of the impregnated support. In order to implement the technique described in the invention, the catalyst can be used as is, or reduced in situ in the reactor under a hydrogen current, at a temperature of between 200° C. and 400° C., before turning the unit on.

When the technique described in the invention is initiated, in order to avoid uncontrollable runaway problems with the controlled oxidation reaction, the contact time between the gaseous hydrocarbon mixture, the oxidizing gas and when applicable, the water vapor, will be adjusted to a value of between 0.5 and 5 seconds.

Favorably, in this invention, the quantity of steam added will be limited to a water vapor-to-hydrocarbon carbon ($H_2O/C$) molar ratio of less than or equal to 0.2.

In a preferred method of implementing this invention, the temperature of the catalyst bed is maintained between 900° C. and 1,300° C. The higher the temperature, the more CO formation is promoted with respect to the formation of $CO_2$, which results in an increased overall effectiveness of the subsequent steps of the synthesis gas conversion process, such as the Fischer Tropsch conversion or methanol production.

However, when it is necessary to work under high pressures of above $25 \times 10^5$ Pa, it is preferable to operate in at least two successive steps: an initial step to condition the silicon carbide under pressure of between $5 \times 10^5$ and $10 \times 10^5$ Pa for at least two hours, and then a second step under pressure of between $25 \times 10^5$ and $80 \times 10^5$ Pa.

In one preferred method of implementing the invention, in order to make the reaction self-igniting, the gases are preheated to between 400° C. and 650° C. before they are put in the catalyst bed.

The hydrocarbons enabling the formation of synthesis gas are chosen from among gasoline, deposit gas condensates, and hydrocarbons with 1 to 3 carbon atoms, preferably methane.

As described above, the technique described in the invention can be implemented in existing ATR units.

Examples will be described below to illustrate the invention, without limiting its scope.

Two figures are appended to illustrate Example 3:

EXAMPLE 1

Figure 1:
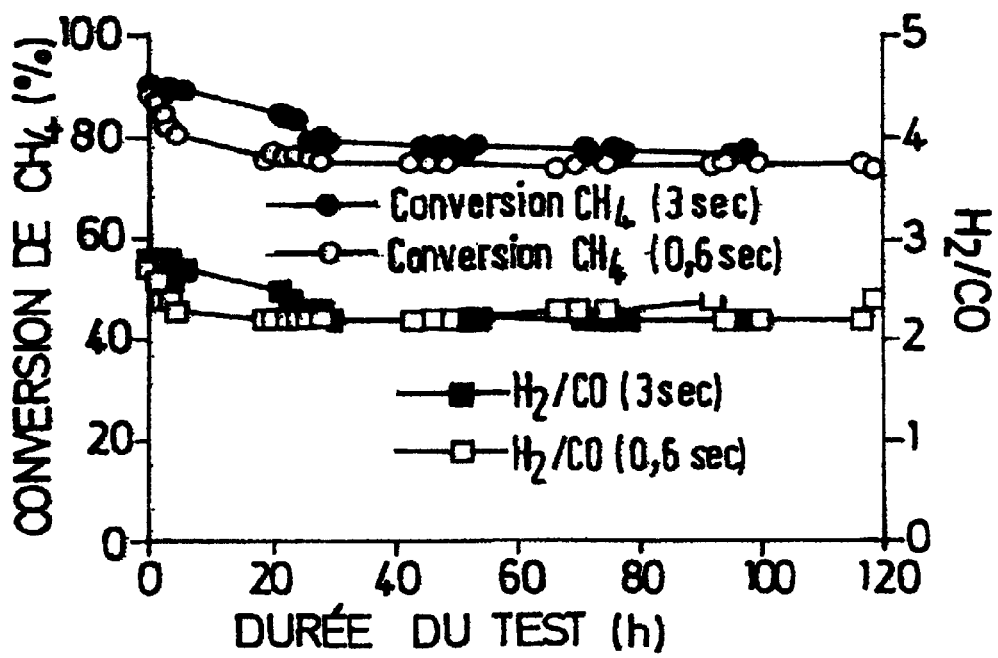
FIG. 1 represents two partial oxidation curves for methane on the γ alumina-based catalyst ($C_1$) under the conditions of Example 3 for two contact times, 0.6 and 3 seconds respectively.

This example will attempt to illustrate the effectiveness of the silicon carbide-based catalytic supports with a BET specific surface of less than 100 $m^2/g$ and, more specifically, of between 15 and 80 $m^2/g$.

A 10-g sample of silicon carbide (SiC) in the form of 0.4- to 1-mm grains, with a BET specific surface of 40 $m^2/g$ is used in this example. It was previously impregnated with a nickel nitrate solution, enabling the deposit of 2.6 g of salt on the SiC to obtain a final nickel content of 5% by weight with respect to the final catalyst. The impregnated catalyst is dried in 100° C. air, and then calcinated at 300° C. in dry air.

In a microreactor, 2 g of SiC-supported catalyst is added, and then the atmosphere in the reactor is purged with airflow at room temperature. The pressure in the reactor is then raised to $5 \times 10^5$ Pa in a mixture of methane and air with a carbon/oxygen molar ratio of 2.6, while the temperature in the catalyst bed is 900° C. The circulation speed of the gaseous mixture is adjusted for a contact time of 3 seconds, and the mixture at the outlet of the reactor is then analyzed online by chromatography in the gaseous phase.

The conversion results and the $H_2/CO$ molar ratios are provided in Table 1 below.

TABLE 1

| Reaction Time (h) | HC/CO Conversion (% by weight) | $H_2/CO$ Molar Ratio |
| --- | --- | --- |
| 1 | 75.0 | 2.2 |
| 2 | 74.2 | 2.1 |
| 3 | 74.6 | 2.1 |
| 4 | 75.8 | 2.0 |

TABLE 1-continued

| Reaction Time (h) | HC/CO Conversion (% by weight) | $H_2/CO$ Molar Ratio |
|---|---|---|
| 24 | 75.1 | 2.1 |
| 48 | 75.4 | 2.1 |
| 72 | 73.8 | 2.0 |
| 96 | 75.7 | 2.1 |

These results comply with what was expected, which was an $H_2/CO$ molar ratio of approximately 2 and a conversion rate of more than 70%.

When a shorter contact time was used, less than 0.5 seconds, the conversions and the molar ratios were comparable.

The properties of these results confirm the advantage of the technique, which makes it possible to more easily implement (longer contact time) the catalyst partial oxidation of methane or any other condensate, with a single catalyst bed.

Likewise, we have not observed any deactivation of the catalyst.

EXAMPLE 2

In this example, we operate with the same catalyst as in Example 1, but with a gas mixture with a methane/air ratio of 2 (or $CH_4/O_2=2$). The results are provided in Table 2 below.

TABLE 2

| Reaction Time (h) | HC/CO Conversion (% by weight) | $H_2/CO$ Molar Ratio |
|---|---|---|
| 1 | 90.1 | 2.1 |
| 2 | 89.5 | 2.0 |
| 3 | 90.3 | 2.0 |
| 4 | 90.5 | 2.1 |
| 24 | 89.3 | 2.0 |
| 48 | 90.0 | 2.1 |
| 72 | 89.6 | 2.0 |
| 96 | 89.0 | 2.0 |

By operating with an $HC/O_2$ ratio of 2, by comparison to Example 1, an increase in the conversion of nearly 90% is obtained, so that the $H_2/CO$ ratio at the outlet remains unmodified at a value of 2.

EXAMPLE 3

The purpose of this example is to show the ability of the silicon carbide-based support to rapidly diffuse the heat produced during the methane oxidation reaction outside the reaction zone, thus preventing runaway in the system temperature.

In this example, two catalysts, each with the same 5% nickel content by weight; are tested: one, $C_2$, is on a SiC support (grains 6 mm long and 2 mm in diameter), with a specific surface equal to 25 m²/g, while the other ($C_1$) is gamma alumina-based with a high specific surface of 224 m²/g. The supports are impregnated according to the same operational method as the one described in Example 1. The controlled methane oxidation reaction is conducted under the following conditions: reaction temperature: 900° C.; $CH_4/O_2$ ratio: 2.6; total pressure: $5 \times 10^5$ Pa; contact time: 3 seconds. The results obtained are presented in FIG. 1 for $C_1$ and in FIG. 2 for $C_2$, for an identical test time.

Figure 2:
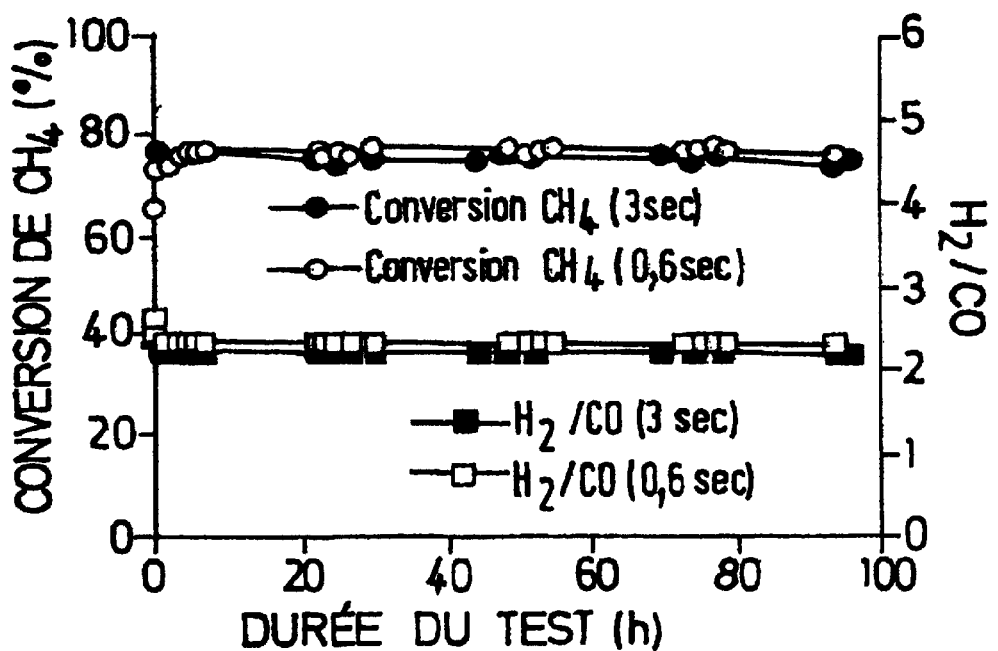
FIG. 2 represents a partial oxidation curve for methane on the SiC-based catalyst ($C_2$) under the conditions of Example 3 for two contact times, 0.6 and 3 seconds respectively.

With the γ alumina-based catalyst $C_1$, the heat produced during the reaction is extremely significant, causing a total conversion that largely exceeds the one produced by thermodynamics (FIG. 1). By taking into account the thermodynamic data, the excess temperature produced in the first hours of the test on the alumina exceeds a few hundred degrees. In this situation, it is probable that the methane decomposes essentially into carbon and hydrogen. Then, as the quantity of carbon deposited on the catalyst increases, the catalyst increasingly becomes a conductor and the complete conversion returns to the level expected for a reaction temperature of 900° C.

With the SiC-based catalyst $C_2$, a conversion runaway upon initiation of the reaction did not occur (FIG. 2), due to the high thermal conductivity of the support, which quickly evacuated the heat formed outside of the reaction zone.

The comparison of the thermal behavior of these two catalysts once again confirms the superiority of a SiC-based catalyst compared to an alumina-based catalyst, since the first diffuses the heat produced by the reaction more rapidly during the initiation phase.

We also noted that the quantity of carbon deposited on the catalyst is lower for catalyst $C_2$ than for catalyst $C_1$. Furthermore, there is a deterioration of the structure of the γ alumina-based catalyst: the specific surface drops to 62 m²/g, and the mechanical resistance decreases (a part of the support in extruded form was fragmented into smaller grains).

In order to eliminate the carbon and evaluate the possibilities of regenerating these catalysts, the spent catalysts $C_1$ and $C_2$ were subjected to an oxidizing regeneration in air. This regeneration consists of increasing the temperature of the reactor from room temperature to a temperature of 900° C., with an increase rate of 10° C./min, then maintaining this temperature for 30 minutes, in order to burn the carbon. After cooling, it was noted that alumina-based catalyst $C_1$ did not resist the oxidizing regeneration treatment and was completely destroyed, while SiC-based catalyst $C_2$ retained its initial texture.

Figure 3:
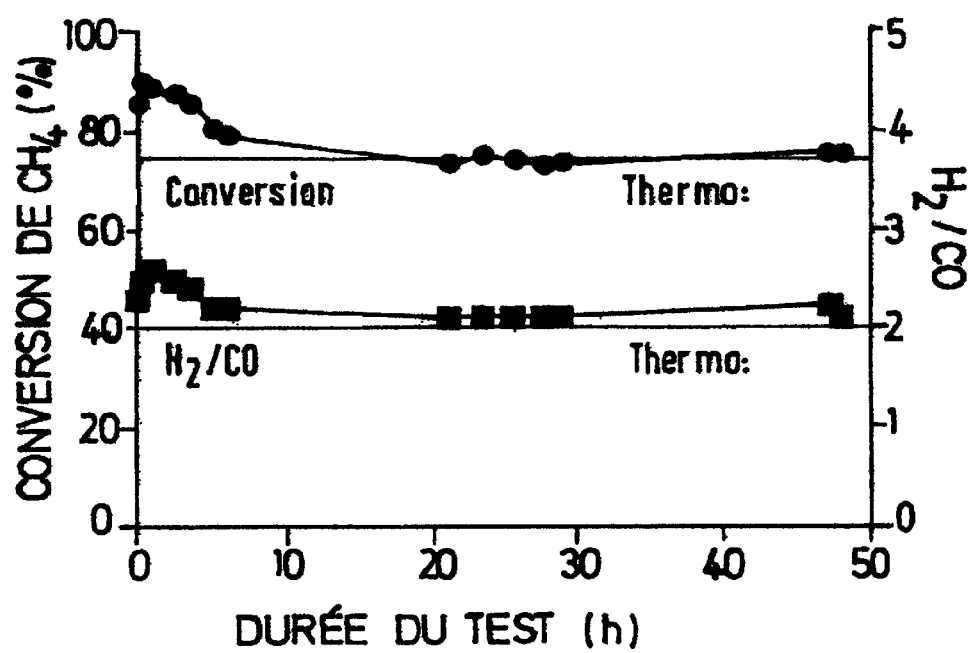
FIG. 3 represents a partial oxidation curve for methane on the a alumina-based catalyst under the conditions of Example 3 for a contact time of 3 seconds.

By using an α alumina-based catalyst with a specific surface of 5 m²/g, under the same operating conditions with a contact time of 3 seconds, the results obtained are comparable to those obtained with a γ alumina base (see FIG. 3) with grain rupture.

The invention claimed is:

1. A method for obtaining synthesis gas by catalytic partial oxidation, comprising putting a hydrocarbon in its gaseous state in contact with an oxidizing gas, and optionally water vapor, in the presence of a catalyst that includes a silicon carbide and at least one metal consisting of a metal of Group VIII deposited on the silicon carbide, at a temperature greater than 800° C., wherein the silicon carbide has a specific surface, determined by the BET method, of less than or equal to 100 m²/g, where the contact time between the gaseous hydrocarbon mixture, the oxidizing gas and the optional water vapor, and the catalyst is longer than 0.05 seconds, and in that the pressure inside the reactor is greater than atmospheric pressure.

2. The method of claim 1, wherein the reaction temperature is between 800 and 1,400° C.

3. The method of claim 1, wherein the contact time of the gaseous hydrocarbon mixture, the oxidizing gas, and the optional water vapor with the catalyst is between 0.05 and 5 seconds.

4. The method of claim 1, wherein the oxidizing gas contains more than 20% oxygen by volume.

5. The method of claim 1, wherein the molar ratio of the carbon from the hydrocarbon to the oxygen varies between 1.6 and 2.6.

6. The method of claim 1, wherein the catalyst contains more than 50% silicon carbide by weight, with a BET specific surface of between 15 and 80 m$^2$/g.

7. The method of claim 1, wherein the silicon carbide in said catalyst has a mesoporosity as determined by the nitrogen BET method of between 20 and 100 nm, and a macroporosity determined by the mercury porosity measurement of between 5 and 100 μm.

8. The method of claim 1, wherein the silicon carbide is solid and comprised of formed or unformed grains or of solid foam.

9. The method of claim 1, wherein the pressure in the reactor is between 2×10$^5$ and 150×10$^5$ Pa.

10. The method of claim 1, wherein the catalyst includes 0.5% to 20% by weight of a metal from Group VIII.

11. The method of claim 10, wherein the metal from Group VIII is nickel.

12. The method of claim 1, wherein the contact time between the gaseous hydrocarbon mixture, the oxidizing gas, and the optional water vapor is between 0.5 and 5 seconds.

13. The method of claim 1, wherein the water vapor is added in a water vapor-to-hydrocarbon carbon (H$_2$O/C) molar ratio of less than or equal to 0.2.

14. The method of claim 1, wherein the temperature of the catalyst bed is maintained at between 900° C. and 1,300° C.

15. The method of claim 1, further comprising an initial step for conditioning the silicon carbide under pressure of between 5×10$^5$ and 10×10$^5$ Pa for at least two hours, and then a second step under pressure of between 25×10$^5$ and 80×10$^5$ Pa.

16. The method of claim 1, wherein the gases are preheated to between 400° C. and 500° C. before being put in contact with the catalyst.

17. The method of claim 1, wherein the hydrocarbons are selected from the group consisting of gasoline, deposit gas condensates, and hydrocarbons containing 1 to 3 atoms of carbon.

18. The method of claim 4, wherein the oxidizing gas contains between 40% and 100% oxygen by volume.

19. The method of claim 6, wherein the catalyst contains more than 50% silicon carbide by weight, with a BET specific surface of between 20 and 40 m$^2$/g.

20. The method of claim 9, wherein the pressure in the reactor is between 5×10$^5$ and 80×10$^5$ Pa.

21. The method of claim 10, wherein the catalyst includes 1% to 10% by weight of a metal from Group VIII.

22. The method of claim 17, wherein the hydrocarbons are methane.

23. The method of claim 1, wherein the catalyst consists of silicon carbide and at least one metal consisting of a metal of Group VIII deposited on the silicon carbide.

* * * * *